US012752301B2

(12) United States Patent
Jiang

(10) Patent No.: US 12,752,301 B2
(45) Date of Patent: Oct. 6, 2026

(54) ULTRASONIC TRANSDUCER MODULE

(71) Applicant: Qisda Corporation, Taoyuan City (TW)

(72) Inventor: Fu-Sheng Jiang, Taoyuan City (TW)

(73) Assignee: Qisda Corporation, Taoyuan City (TW)

( * ) Notice: Subject to any disclaimer, the term of this patent is extended or adjusted under 35 U.S.C. 154(b) by 869 days.

(21) Appl. No.: 18/182,379

(22) Filed: Mar. 13, 2023

(65) Prior Publication Data

US 2023/0415196 A1 Dec. 28, 2023

(30) Foreign Application Priority Data

Jun. 27, 2022 (TW) .................................. 111123827

(51) Int. Cl.
*B06B 1/06* (2006.01)

(52) U.S. Cl.
CPC .......... *B06B 1/0614* (2013.01); *B06B 1/0651* (2013.01); *B06B 1/067* (2013.01)

(58) Field of Classification Search
CPC ....... B06B 1/06; B06B 1/0614; B06B 1/0651; B06B 1/067
USPC ........................................ 310/322, 334, 335
See application file for complete search history.

(56) References Cited

U.S. PATENT DOCUMENTS

2003/0173870 A1* 9/2003 Simon Hsu ........... B06B 1/0611 310/334
2009/0048519 A1* 2/2009 Hossack .............. G10K 11/004 600/459
2011/0121687 A1* 5/2011 Aoki ..................... B06B 1/0677 310/334
2013/0076208 A1* 3/2013 Osawa .................... B06B 1/064 310/334
2015/0105663 A1* 4/2015 Kiyose .................... B06B 1/067 29/25.35

FOREIGN PATENT DOCUMENTS

CN 109984771 7/2019

* cited by examiner

*Primary Examiner* — Derek J Rosenau
(74) *Attorney, Agent, or Firm* — JCIPRNET

(57) ABSTRACT

An ultrasonic transducer module including a first electrode layer, a second electrode layer, a first piezoelectric material layer, a third electrode layer, a fourth electrode layer, a second piezoelectric material layer, and an insulation layer is provided. The first piezoelectric material layer is disposed between the first electrode layer and the second electrode layer. The second electrode layer is disposed between the first piezoelectric material layer and the third electrode layer. The second piezoelectric material layer is disposed between the third electrode layer and the fourth electrode layer. The insulation layer is disposed between the second electrode layer and the third electrode layer.

18 Claims, 6 Drawing Sheets

ULTRASONIC TRANSDUCER MODULE

CROSS-REFERENCE TO RELATED APPLICATION

This application claims the priority benefit of Taiwan application serial no. 111123827, filed on Jun. 27, 2022. The entirety of the above-mentioned patent application is hereby incorporated by reference herein and made a part of this specification.

BACKGROUND

Technical Field

The disclosure relates to a transducer, and in particular, to an ultrasonic transducer module.

Description of Related Art

The ultrasonic transducer is a transducer that realizes the mutual conversion of sound energy and electrical energy in the ultrasonic frequency range. Ultrasonic transducers may be mainly divided into three categories: 1. transmitters; 2. receivers; and 3. transceiver transducers. A transducer configured to transmit ultrasonic waves is referred to as a transmitter. When in the transmitting state, the transducer converts electrical energy into mechanical energy and then into sound energy. A transducer configured to receive sound waves is referred to as a receiver. When in the receiving state, the transducer converts sound energy into mechanical energy and then into electrical energy. In some cases, a transducer may be configured as both a transmitter and a receiver, which is referred to as a transceiver transducer. Transceiver transducers are the core content and one of the key technologies of ultrasonic technology, and are widely used in the fields including non-destructive testing, medical imaging, ultrasonic microscopes, fingerprint identification and the Internet of Things.

When the conventional ultrasonic transducer detects the human body, in response to the needs of different tissues or parts to be detected (such as the heart, carotid artery, abdomen, etc.), the frequency and resolution of the ultrasonic waves used are also different. At this time, when changing different parts for ultrasonic image detection, changing different ultrasonic transducers is often necessary, which causes inconvenience in use and increase in equipment cost.

SUMMARY

The disclosure provides an ultrasonic transducer module, which integrates two or more ultrasonic transducers together, and thus has the advantages of convenient use and reduction in equipment quantities and cost.

An embodiment of the disclosure provides an ultrasonic transducer module, which includes a first electrode layer, a second electrode layer, a first piezoelectric material layer, a third electrode layer, a fourth electrode layer, a second piezoelectric material layer, and an insulation layer. The first piezoelectric material layer is disposed between the first electrode layer and the second electrode layer. The second electrode layer is disposed between the first piezoelectric material layer and the third electrode layer. The second piezoelectric material layer is disposed between the third electrode layer and the fourth electrode layer. The insulation layer is disposed between the second electrode layer and the third electrode layer. A wavelength of a sound wave corresponding to frequency corresponding to a thickness of the first piezoelectric material layer in the second piezoelectric material layer is 1, a thickness of the second piezoelectric material layer is T1, and $((2N-1)/4-1/8)\times\lambda 1<T1<((2N-1)/4+1/8)\times\lambda 1$, where N is a positive integer.

An embodiment of the disclosure provides an ultrasonic transducer module, which includes a first electrode layer, a second electrode layer, a first piezoelectric material layer, a third electrode layer, a fourth electrode layer, a second piezoelectric material layer, and an insulation layer. The first piezoelectric material layer is disposed between the first electrode layer and the second electrode layer. The second electrode layer is disposed between the first piezoelectric material layer and the third electrode layer. The second piezoelectric material layer is disposed between the third electrode layer and the fourth electrode layer. The insulation layer is disposed between the second electrode layer and the third electrode layer. An absolute value of a difference between a thickness of the first piezoelectric material layer and a thickness of the second piezoelectric material layer is less than 10% of the thickness of the first piezoelectric material layer, a width of the first piezoelectric material layer is d, a width of the second piezoelectric material layer is D, and $d<4D/5$.

An embodiment of the disclosure provides an ultrasonic transducer module, which includes a first electrode layer, a second electrode layer, a first piezoelectric material layer, a third electrode layer, a fourth electrode layer, a second piezoelectric material layer, and an insulation layer. The first piezoelectric material layer is disposed between the first electrode layer and the second electrode layer. The second electrode layer is disposed between the first piezoelectric material layer and the third electrode layer. The second piezoelectric material layer is disposed between the third electrode layer and the fourth electrode layer. The insulation layer is disposed between the second electrode layer and the third electrode layer. An absolute value of a difference between a thickness of the first piezoelectric material layer and a thickness of the second piezoelectric material layer is less than 10% of the thickness of the first piezoelectric material layer, and a width of the first piezoelectric material layer is different from a width of the second piezoelectric material layer.

In the ultrasonic transducer module of the embodiment of the disclosure, the first piezoelectric material layer and the second piezoelectric material layer that are stacked are used, which is equivalent to integrating multiple ultrasonic transducers together. Therefore, the ultrasonic transducer module of the embodiment of the disclosure has the advantages of convenient use and reduction in equipment quantities and cost.

DESCRIPTION OF THE EMBODIMENTS

Figure 1A:
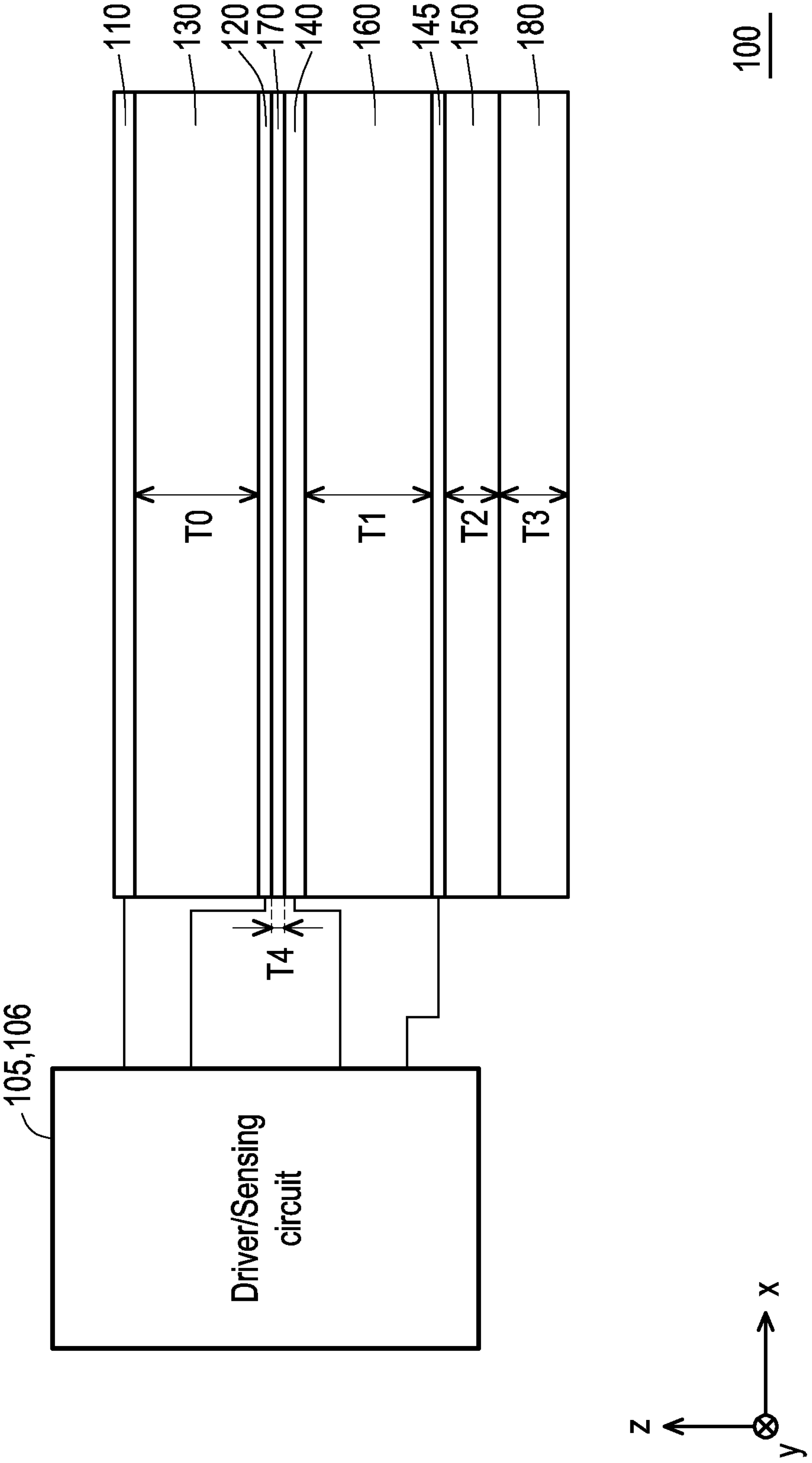
FIG. 1A is a schematic cross-sectional view of an ultrasonic transducer module according to an embodiment of the disclosure.
Figure 1B:
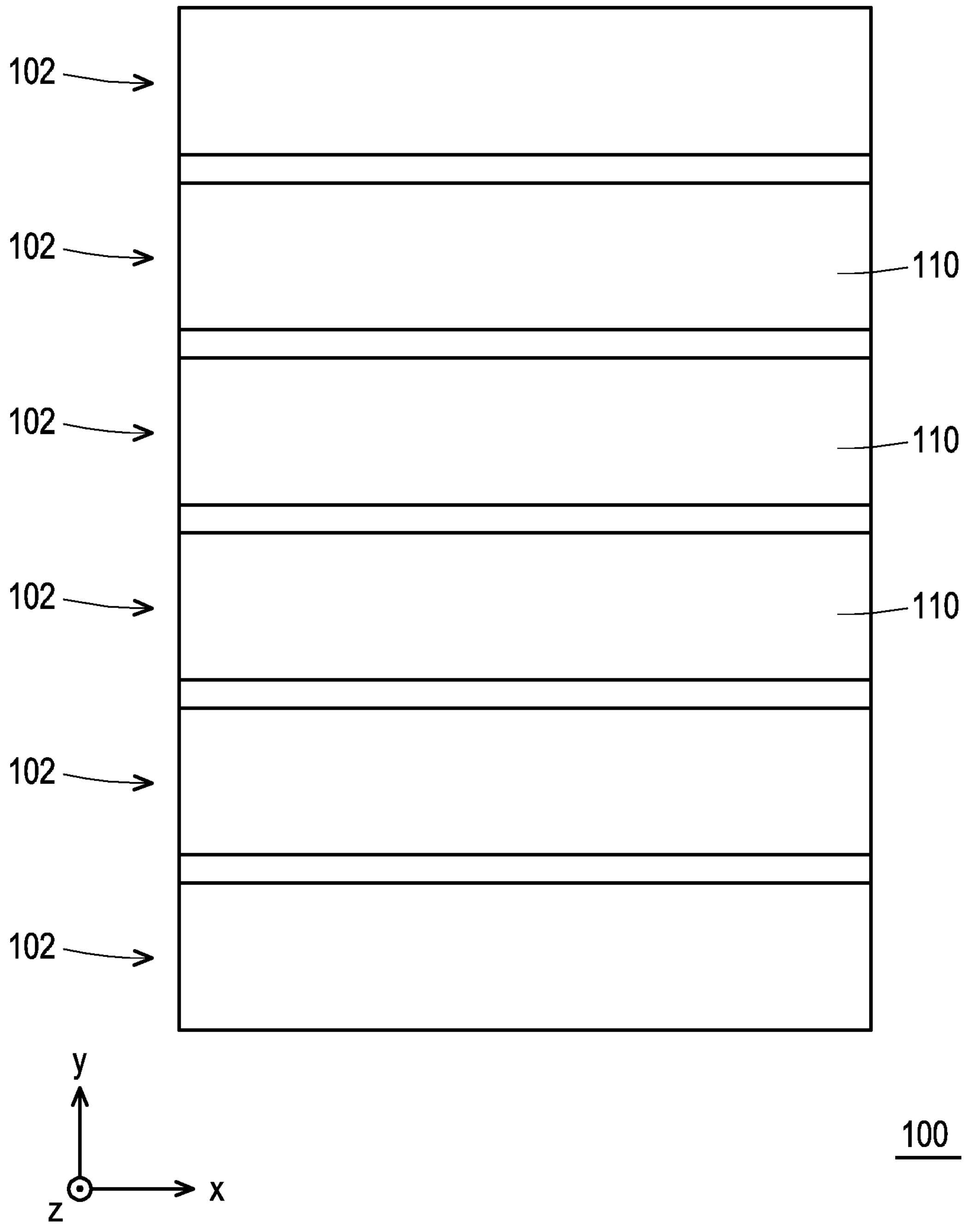
FIG. 1B is a schematic top view of the ultrasonic transducer module of FIG. 1A.

FIG. 1A is a schematic cross-sectional view of an ultrasonic transducer module according to an embodiment of the disclosure, and FIG. 1B is a schematic top view of the ultrasonic transducer module of FIG. 1A. Referring to FIGS. 1A and 1B, an ultrasonic transducer module 100 of the embodiment includes a first electrode layer 110, a second electrode layer 120, a first piezoelectric material layer 130, a third electrode layer 140, a fourth electrode layer 145, a second piezoelectric material layer 160, and an insulation layer 170. The first piezoelectric material layer 130 is disposed between the first electrode layer 110 and the second electrode layer 120, and the second electrode layer 120 is disposed between the first piezoelectric material layer 130 and the third electrode layer 140. The second piezoelectric material layer 160 is disposed between the third electrode layer 140 and the fourth electrode layer 145, and the insulation layer 170 is disposed between the second electrode layer 120 and the third electrode layer 140.

In the embodiment, the ultrasonic transducer module 100 may further include a driver 105, electrically connected to the first electrode layer 110, the second electrode layer 120, the third electrode layer 140, and the fourth electrode layer 145. When the driver 105 applies a voltage difference between the first electrode layer 110 and the second electrode layer 120, the first piezoelectric material layer 130 is deformed to emit ultrasonic waves. When the driver 105 applies a voltage difference between the third electrode layer 140 and the fourth electrode layer 145, the second piezoelectric material layer 160 is deformed to emit ultrasonic waves. The ultrasonic waves emitted by the first piezoelectric material layer 130 penetrate the second electrode layer 120, the insulation layer 170, the third electrode layer 140, the second piezoelectric material layer 160, and the fourth electrode layer 145 in sequence, and then pass downward. The ultrasonic waves emitted by the second piezoelectric material layer 160 penetrate the fourth electrode layer 145 and pass downward. Therefore, when the first piezoelectric material layer 130 is actuated, the second piezoelectric material layer 160 may be regarded as a matching layer of the first piezoelectric material layer 130.

In the embodiment, the ultrasonic transducer module 100 may further include a sensing circuit 106, electrically connected to the first electrode layer 110, the second electrode layer 120, the third electrode layer 140, and the fourth electrode layer 145. When an external object located under the fourth electrode layer 145 reflects the ultrasonic waves, the reflected ultrasonic waves penetrate the fourth electrode layer 145, the second piezoelectric material layer 160, the third electrode layer 140, the insulation layer 170, and the second electrode layer 120 in sequence, and then pass to the first piezoelectric material layer 130, which causes the first piezoelectric material layer 130 to generate vibration. The vibration causes a piezoelectric effect, so that the first electrode layer 110 and the second electrode layer 120 output a voltage signal, and the sensing circuit 106 may sense and analyze the voltage signal, and then obtain an ultrasonic image or an object distance value. On the other hand, when the external object located under the fourth electrode layer 145 reflects the ultrasonic waves, and the reflected ultrasonic waves penetrate the fourth electrode layer 145 and pass to the second piezoelectric material layer 160, which causes the second piezoelectric material layer 160 to generate vibration. The vibration causes a piezoelectric effect, so that the third electrode layer 140 and the fourth electrode layer 145 output a voltage signal, and the sensing circuit 106 may sense and analyze the voltage signal, and then obtain an ultrasonic image or an object distance value.

A wavelength of a sound wave corresponding to the frequency corresponding to a thickness T0 of the first piezoelectric material layer 130 in the second piezoelectric material layer 160 is λ1, a thickness of the second piezoelectric material layer 160 is T1, and the ultrasonic transducer conforms to:

$$((2N-1)/4-\tfrac{1}{8})\times\lambda 1<T1<((2N-1)/4\tfrac{1}{8})\times\lambda 1 \qquad \text{Formula (1)}$$

In Formula (1), N is a positive integer, and the transmission of the sound wave is better when Formula (1) is met. In an embodiment, an exemplary value of T1 is equal to ((2N−1)/4)×λ1.

The transmission of the ultrasonic wave conforms to:

$$C=f\times\lambda \qquad \text{Formula (2)}$$

In Formula (2), C is the sound velocity of the sound wave in a transmission medium, f is the frequency of the sound wave, and λ is the wavelength of the sound wave in the transmission medium. It is assumed that the first piezoelectric material layer 130 and the second piezoelectric material layer 160 use the same piezoelectric material, and the sound velocity of the ultrasonic waves in the first piezoelectric material layer 130 and the second piezoelectric material layer 160 is both 3000 m/s. However, in other embodiments, the first piezoelectric material layer 130 and the second piezoelectric material layer 160 may also use different piezoelectric materials, and ultrasonic waves have different sound velocity when transmitted therein. In the embodiment, the thickness T0 of the first piezoelectric material layer 130 is generally half the wavelength of the ultrasonic wave generated by the first piezoelectric material layer 130, so the thickness T0 of the first piezoelectric material layer 130 may determine the frequency of the first piezoelectric material layer 130. Here, it is assumed that the frequency corresponding to the thickness T0 of the first piezoelectric material layer 130 is designed to be 10 MHz. According to Formula (2), the wavelength of the sound wave λ1=3000 (m/s)/10 (MHz)=300 (μm) corresponding to the frequency corresponding to the thickness T0 of the first piezoelectric material layer 130 in the second piezoelectric material layer 160 may be obtained, in which the thickness T0 of the first piezoelectric material layer 130 with a frequency of 10 MHz takes ½ of the wavelength of the sound wave λ1, so the thickness T0 is 150 μm. If the thickness T1 of the second piezoelectric material layer 160 is selected to be designed to be (¾)×λ1 in order to comply with Formula (1), T1 may be 225 μm. The wavelength of the sound wave corresponding to the frequency of the second piezoelectric material layer 160 in the second piezoelectric material layer 160 is twice the thickness T1, that is, 450 μm, and is substituted into Formula (2), and the frequency of the second piezoelectric material layer 160 that is 3000 (m/s)/450 (μm)=6.67 (MHz) may be obtained. In respect of the frequency in the embodiment, the driver 105 may respectively drive the first piezoelectric material layer 130 and the second piezoelectric material layer 160, so as to achieve ultrasonic sensing of different frequencies. Ultrasonic waves of different frequencies may achieve different sensing depths, and the advantage of ultrasonic waves with higher frequencies is that higher resolution may be achieved, but the disadvantage is that the energy is more easily attenuated with the transmission distance in the material. Therefore, the ultrasonic transducer module 100 of the embodiment may be multi-purpose, and can be applied to detect different tissues or different parts (for example, the heart, carotid artery, abdomen, etc.). That is to say, in the ultrasonic transducer module 100 of the embodiment, the first piezoelectric material layer 130 and the second piezoelectric material layer 160 that are stacked are used, which is equivalent to integrating multiple ultrasonic transducers together. Therefore, the ultrasonic transducer module 100 of the embodiment has the advantages of convenient use and reduction in equipment quantities and cost. Since the first piezoelectric material layer 130 and the second piezoelectric material layer 160 are disposed in a stacked manner, the first piezoelectric material layer 130 and the second piezoelectric material layer 160 have a coaxial coordinate system, which may be configured for the algorithm to connect ultrasonic images respectively sensed by the first piezoelectric material layer 130 and the second piezoelectric material layer. In other embodiments, more than two ultrasonic transducers may also be stacked together to form an ultrasonic transducer module integrating more than two ultrasonic transducers. For example, a third piezoelectric material layer may be disposed between a fifth electrode layer and a sixth electrode layer, and another insulation layer may be disposed between the fourth electrode layer 145 and the fifth electrode layer, and a third ultrasonic transducer is formed, and so on if there are more ultrasonic transducers.

In the embodiment, the ultrasonic transducer module 100 further includes a first matching layer 150, the fourth electrode layer 145 is disposed between the second piezoelectric material layer 160 and the first matching layer 150, and an average value of the frequency corresponding to the thickness T0 of the first piezoelectric material layer 130 and the frequency corresponding to the thickness T1 of the second piezoelectric material layer 160 is f. In the above example, the average value f is, for example, (10 (Mhz)+6.67 (Mhz))/2=8.335 Mhz. A wavelength of the sound wave corresponding to f in the first matching layer 150 is λ2. It is assumed that the sound velocity of the sound wave in the first matching layer 150 is 1800 m/s, and according to Formula (2), λ2=1800 (m/s)/8.335 (Mhz)=216 μm. In the embodiment, a thickness of the first matching layer is T2, and the ultrasonic transducer module 100 may conform to:

$$((2K-1)/4-1/8)\times\lambda 2<T2<((2K-1)/4+1/8)\times\lambda 2 \quad \text{Formula (3)}$$

In Formula (3), K is a positive integer. In an embodiment, T2 is exemplarily equal to ((2K−1)/4)×λ2.

In the above practical example, if T2 is selected to be designed to be equal to (¼)×λ2 in order to comply with Formula (3), T2=54 μm may be calculated.

In the embodiment, the ultrasonic transducer module 100 further includes a second matching layer 180, and the first matching layer 150 is disposed between the fourth electrode layer 145 and the second matching layer 180. A wavelength of the sound wave corresponding to fin the second matching layer 180 is λ3. In the above example, the average value f is, for example, (10 (Mhz)+6.67 (Mhz))/2=8.335 Mhz. It is assumed that the sound velocity of the sound wave in the second matching layer 180 is 2520 m/s, and according to Formula (2), λ3=2520 (m/s)/8.335 (Mhz)=302 μm. In the embodiment, a thickness of the second matching layer 180 is T3, and the ultrasonic transducer module 100 may conform to:

$$((2M-1)/4-1/8)\lambda 3<T3<((2M-1)/4+1/8)\times\lambda 3 \quad \text{Formula (4)}$$

In Formula (4), M is a positive integer. In an embodiment, T3 is exemplarily equal to ((2M−1)/4)×λ3.

In the above practical example, if T3 is selected to be designed to be equal to (¼)×λ3 in order to comply with Formula (4), T3=753.5 μm may be calculated.

The first matching layer 150 and the second matching layer 180 may make the change of the sound group of the ultrasonic transducer module 100 from the piezoelectric material layer to the external object (such as the human body) to be gentler, so that the ultrasonic wave is more likely to be able to penetrate the surface of the object (such as the human body), and is less likely to be reflected by the surface of the object. In the embodiment, the first matching layer 150 and the second matching layer 180 are, for example, insulation layers. However, depending on the application scenarios, in other embodiments, the ultrasonic transducer module 100 may not have the second matching layer 180, but only the first matching layer 150, or may not have the first matching layer 150 and the second matching layer 180. Alternatively, in other embodiments, in addition to the first matching layer 150 and the second matching layer 180, one or more other matching layers may be provided below the second matching layer 180.

In the embodiment, a wavelength of the sound wave corresponding to the frequency corresponding to the thickness T0 of the first piezoelectric material layer 130 (for example, 10 MHz in the above example) in the insulation layer 170 is λ4 (for example, in the example, the sound velocity of the ultrasonic wave in the insulation layer 170 is divided by 10 MHz, and λ4 may be obtained), and a thickness T4 of the insulation layer 170 is less than one tenth of λ4.

In the embodiment, the driver 105 may respectively drive the first piezoelectric material layer 130 and the second piezoelectric material layer 160. For example, a voltage difference is applied between the first electrode layer 110 and the second electrode layer 120 and between the third electrode layer 140 and the fourth electrode layer 150 at different times, so that the ultrasonic transducer module 100 can obtain ultrasonic influence or object distance data of different frequencies at different times. However, in other embodiments, the driver 105 may also drive the first piezoelectric material layer 130 and the second piezoelectric material layer 160 at the same time. For example, the first electrode layer 110 and the third electrode layer 140 may be connected to each other by wires, and then connected to the driver 105. In this way, a voltage difference may be simultaneously applied between the first electrode layer 110 and the second electrode layer 120 and between the third electrode layer 140 and the fourth electrode layer 150, so that the first piezoelectric material layer 130 and the second piezoelectric material layer 160 act at the same time.

In the embodiment, the first piezoelectric material layer 130 is divided into multiple segments in an extending direction (for example, a y direction), the first electrode layer 110 is divided into multiple segments in the extending direction (i.e., the y direction) (as shown in FIG. 1B), the second piezoelectric material layer 160 is divided into multiple segments in the extending direction (i.e., the y direction), and the third electrode layer 140 is divided into multiple segments in the extending direction (i.e., the y direction) to form multiple array elements 102 arranged along the y direction. That is to say, in the embodiment, the first electrode layer 110, the first piezoelectric material layer 130, and the second electrode layer 120 form a linear array ultrasonic transducer, and the third electrode layer 140, the second piezoelectric material layer 160, and the fourth electrode layer 145 form another linear array ultrasonic transducer. However, in another embodiment, the first electrode layer 110, the first piezoelectric material layer 130, and the second electrode layer 120 form an arc-shaped ultrasonic transducer, and the third electrode layer 140, the second piezoelectric material layer 160, and the fourth electrode layer 145 form an arc-shaped ultrasonic transducer. That is to say, the ultrasonic transducer module is arc-shaped on a yz section, and the central part of the figure is convex in a −z direction. In the embodiment, a z direction is perpendicular to the first piezoelectric material layer 130, an x direction and the y direction are parallel to the first piezoelectric material layer 130, and the x direction, the y direction, and the z direction are perpendicular to each other.

In the embodiment, the materials of the first electrode layer 110, the second electrode layer 120, the third electrode layer 140, and the fourth electrode layer 145 are, for example, gold, silver, aluminum or a combination thereof. The materials of the first piezoelectric material layer 130 and the second piezoelectric material layer 160 are, for example, lead zirconium titanate (PZT) or other piezoelectric materials. The first matching layer 150 may be conductive silver paste, and has the effect of an electrode layer when having conductivity. The material of the second matching layer 180 is, for example, epoxy resin or plastic, and the plastic is, for example, polyimide (PI) or polyolefins (PO). Alternatively, the second matching layer 180 is, for example, a stacking layer of a flexible printed circuit.

Figure 2:
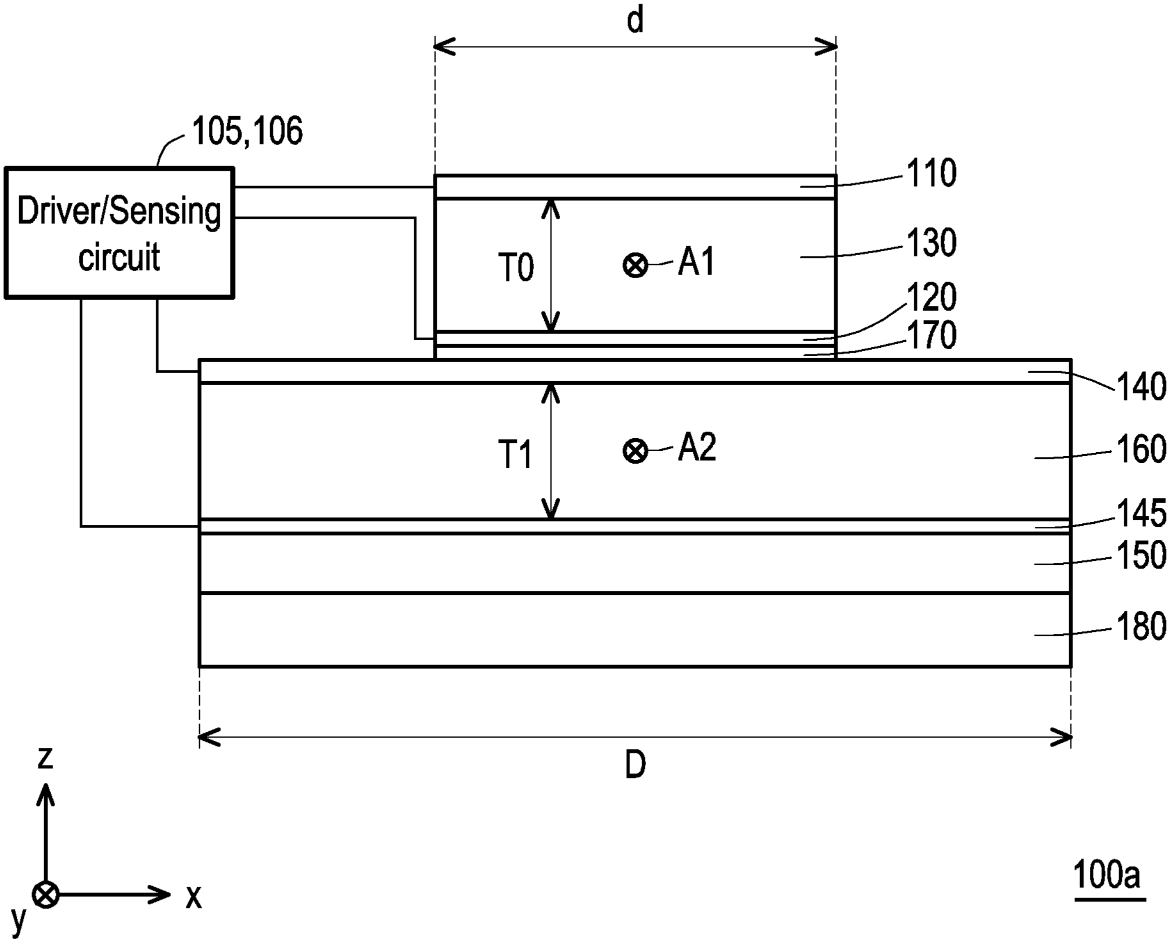
FIG. 2 is a schematic cross-sectional view of an ultrasonic transducer module according to another embodiment of the disclosure.

FIG. 2 is a schematic cross-sectional view of an ultrasonic transducer module according to another embodiment of the disclosure. Referring to FIG. 2, an ultrasonic transducer module 100*a* of the embodiment is similar to the ultrasonic transducer module 100 of FIG. 1A, and the differences between the two are as follows. In the ultrasonic transducer module 100*a* of the embodiment, a width d of the first piezoelectric material layer 130 is smaller than or equal to a width D of the second piezoelectric material layer 160. Furthermore, in an embodiment, $d<4D/5$. In contrast, the first piezoelectric material layer 130 and the second piezoelectric material layer 160 of the ultrasonic transducer module 100 of FIG. 1A have, for example, the same width. In addition, in the ultrasonic transducer module 100*a* of the embodiment, the first electrode layer 110, the first piezoelectric material layer 130, and the second electrode layer 120 form a linear array ultrasonic transducer, and the third electrode layer 140, the second piezoelectric material layer 160, and the fourth electrode layer 145 form a phase array ultrasonic transducer. However, in other embodiments, the configuration may also be that the first electrode layer 110, the first piezoelectric material layer 130, and the second electrode layer 120 form a linear array ultrasonic transducer, and the third electrode layer 140, the second piezoelectric material layer 160, and the fourth electrode layer 145 form a linear array ultrasonic transducer. Alternatively, in other embodiments, the configuration may also be that the first electrode layer 110, the first piezoelectric material layer 130, and the second electrode layer 120 form an arc-shaped ultrasonic transducer, and the third electrode layer 140, the second piezoelectric material layer 160, and the fourth electrode layer 145 form an arc-shaped ultrasonic transducer.

In the embodiment, the thickness T0 of the first piezoelectric material layer 130 and the thickness T1 of the second piezoelectric material layer 160 may be the same as the embodiment of FIG. 1A, that is, Formula (1) is met. However, in other embodiments, the absolute value of the difference between the thickness T0 of the first piezoelectric material layer 130 and the thickness T1 of the second piezoelectric material layer 160 is less than 10% of the thickness of the first piezoelectric material layer 130. In other words, the thickness T0 of the first piezoelectric material layer 130 may be approximately equal to the thickness T1 of the second piezoelectric material layer 160. At this time, the driver 105 may simultaneously drive the first piezoelectric material layer 130 and the second piezoelectric material layer 160 to increase the sensed ultrasonic energy. For example, the first electrode layer 110 and the third electrode layer 140 may be connected to each other by wires, and then connected to the drive 105. However, in other embodiments, the driver 105 may also respectively drive the first piezoelectric material layer 130 and the second piezoelectric material layer 160. In an embodiment, the absolute value of the difference between the thickness T0 of the first piezoelectric material layer 130 and the thickness T1 of the second piezoelectric material layer 160 is less than 10% of the thickness of the first piezoelectric material layer 130, and the width d of the first piezoelectric material layer 130 is different from the width D of the second piezoelectric material layer 160, for example, the width d may be greater than the width D, or the width d may be smaller than the width D.

In an embodiment, the sound velocity of the ultrasonic wave transmitted in the first piezoelectric material layer 130 is, for example, 3000 m/s, and the sound velocity of the ultrasonic wave transmitted in the second piezoelectric material layer 160 is, for example, 3240 m/s. However, in other embodiments, the sound velocity of the ultrasonic wave transmitted in the first piezoelectric material layer 130 may be equal to the sound velocity of the ultrasonic wave transmitted in the second piezoelectric material layer 160. At this time, the frequency of the first piezoelectric material layer 130 may be approximately three times the frequency of the second piezoelectric material layer 160, that is, the thickness T0 of the first piezoelectric material layer 130 is approximately one third of the thickness T1 of the second piezoelectric material layer 160, but the disclosure is not limited thereto.

Figure 3:
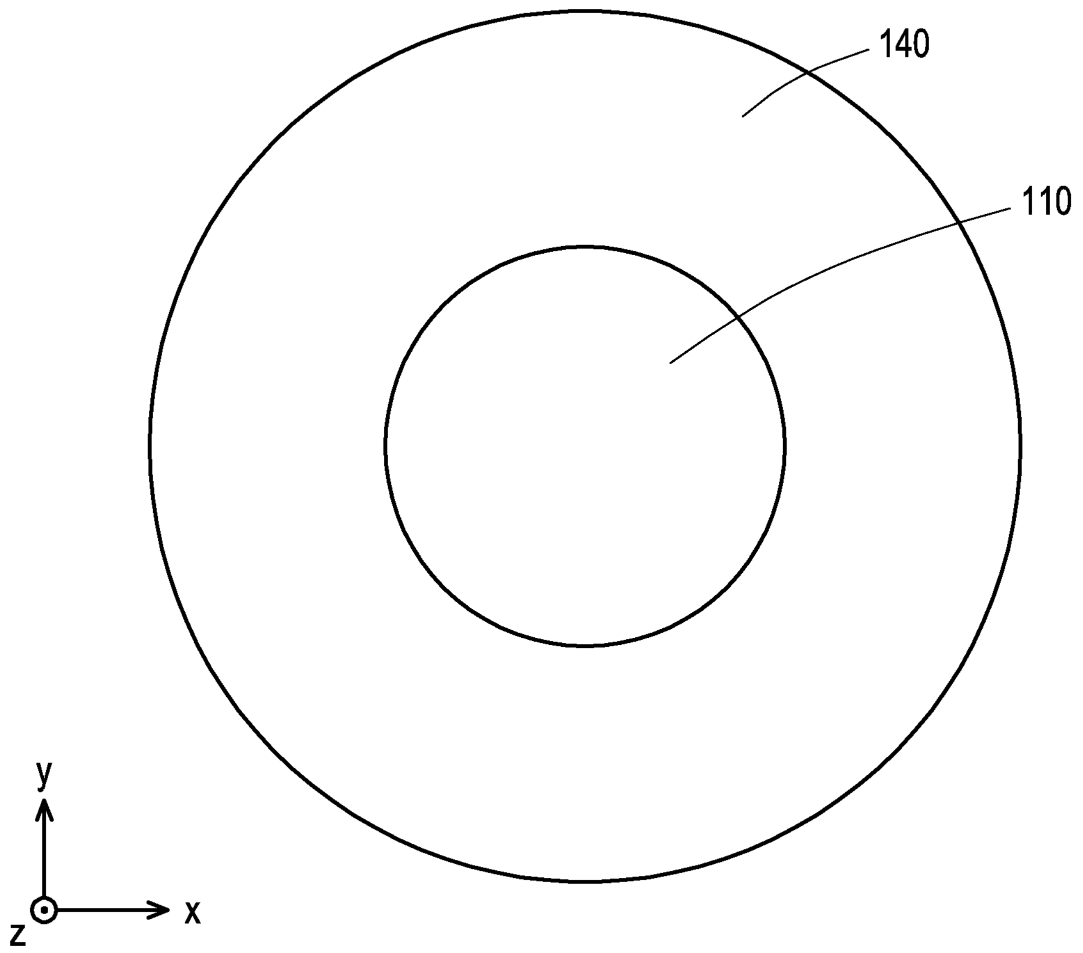
FIG. 3 is a schematic cross-sectional view of an ultrasonic transducer module according to yet another embodiment of the disclosure.

In the embodiment, the first electrode layer 110, the first piezoelectric material layer 130, and the second electrode layer 120 all extend in a straight line in the y direction as shown in FIG. 1B, and the third electrode layer 140, the second piezoelectric material layer 160, and the fourth electrode layer 145 also extend in a straight line in the y direction as shown in FIG. 1B. The first electrode layer 110 and the first piezoelectric material layer 130 may be divided into multiple segments in the y direction to form multiple array elements arranged along the y direction, and the third electrode layer 140 and the second piezoelectric material layer 160 may be divided into multiple segments in the y direction to form multiple array elements arranged along the y direction. However, in another embodiment, the top view corresponding to the cross-sectional structure of FIG. 2 may be as shown in FIG. 3, that is, the first electrode layer 110, the first piezoelectric material layer 130, and the second electrode layer 120 form a single array element circular ultrasonic transducer, and the third electrode layer 140, the second piezoelectric material layer 160, and the fourth electrode layer 145 form a single array element circular ultrasonic transducer. In addition, in another embodiment, the first electrode layer 110, the first piezoelectric material layer 130, and the second electrode layer 120 of the ultrasonic transducer module 100 in which the first piezoelectric material layer 130 and the second piezoelectric material layer 160 have the same width in FIG. 1A may also form a single array element circular ultrasonic transducer, and the third electrode layer 140, the second piezoelectric material layer 160, and the fourth electrode layer 145 may also form a single array element circular ultrasonic transducer.

Figure 4:
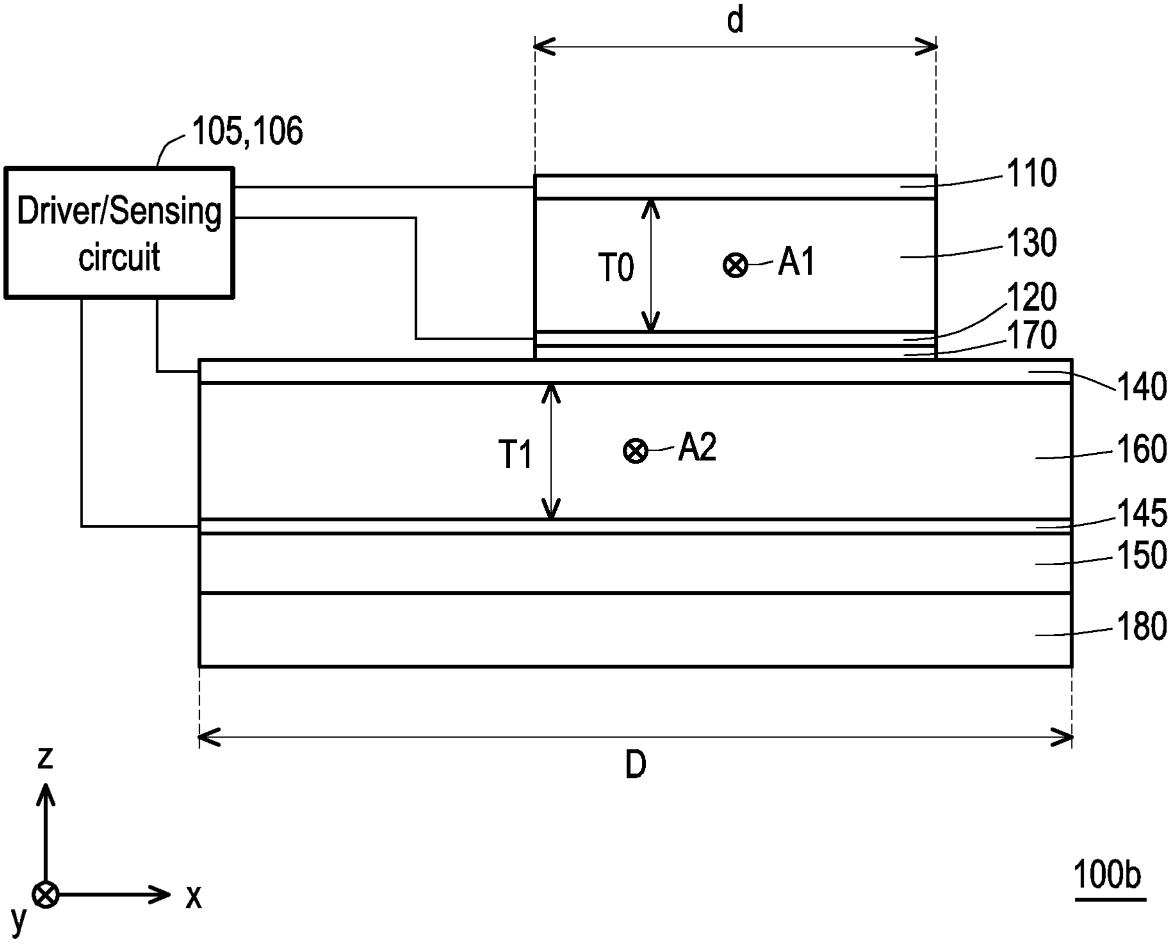
FIG. 4 is a schematic cross-sectional view of an ultrasonic transducer module according to still another embodiment of the disclosure.

FIG. 4 is a schematic cross-sectional view of an ultrasonic transducer module according to still another embodiment of the disclosure. Referring to FIG. 4, an ultrasonic transducer module 100*b* of the embodiment is similar to the ultrasonic transducer module 100*a* of FIG. 2, and the differences between the two are as follows. In the ultrasonic transducer module 100*a* of FIG. 2, a central axis A1 of the first piezoelectric material layer 130 and a central axis A2 of the second piezoelectric material layer 160 are aligned with each other to achieve a better sensing effect. However, in the ultrasonic transducer module 100*b* of the embodiment, the central axis A1 of the first piezoelectric material layer 130 is offset from the central axis A2 of the second piezoelectric material layer 160, which may be adapted for different application scenarios. Moreover, the central axes A1 and A2 are, for example, both parallel to the y direction.

Figure 5:
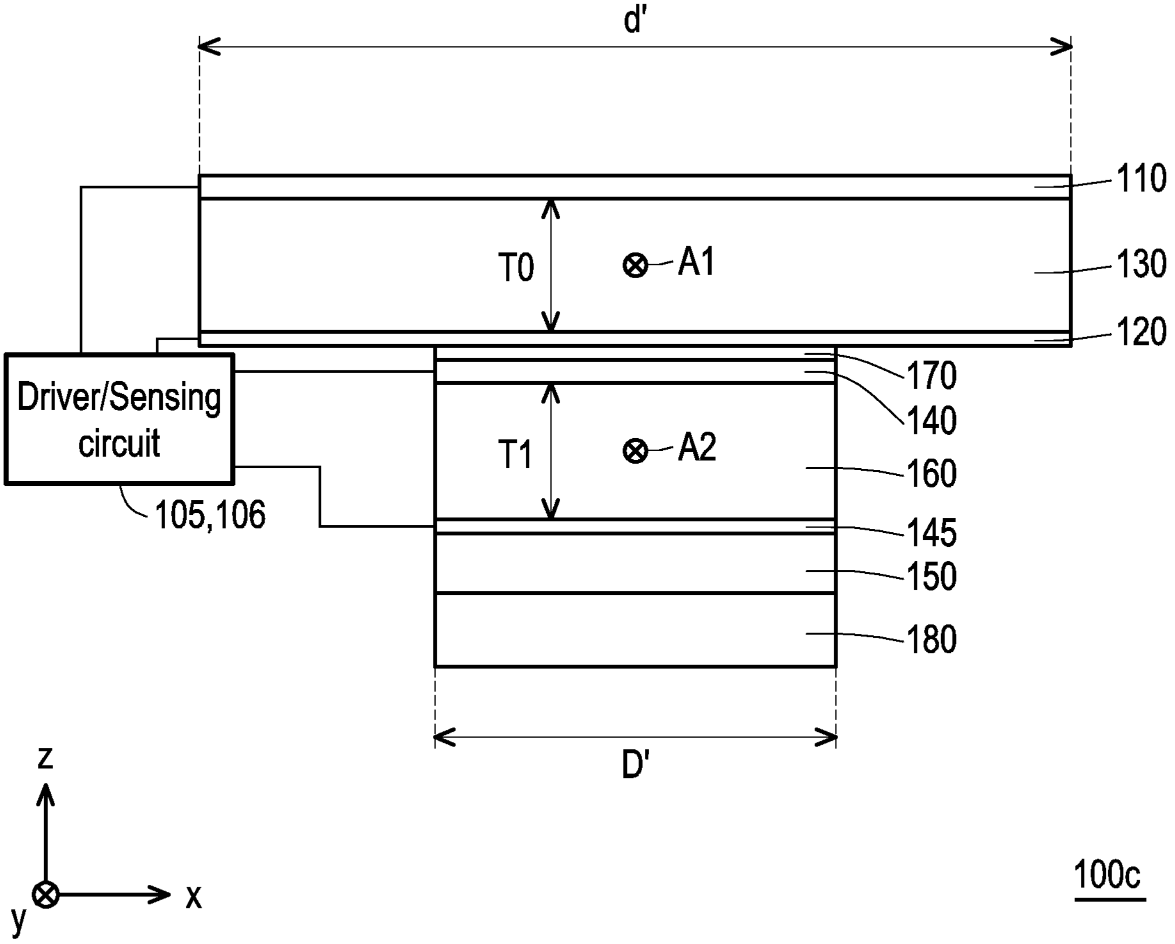
FIG. 5 is a schematic cross-sectional view of an ultrasonic transducer module according to another embodiment of the disclosure.

FIG. 5 is a schematic cross-sectional view of an ultrasonic transducer module according to another embodiment of the disclosure. Referring to FIG. 5, an ultrasonic transducer module 100*c* of the embodiment is similar to the ultrasonic transducer module 100*a* of FIG. 2, and the differences between the two are as follows. In the ultrasonic transducer module 100*c* of the embodiment, a width d' of the first piezoelectric material layer 130 is greater than a width D' of the second piezoelectric material layer 160.

To sum up, in the ultrasonic transducer module of the embodiment of the disclosure, the first piezoelectric material layer and the second piezoelectric material layer that are stacked are used, which is equivalent to integrating multiple ultrasonic transducers together. Therefore, the ultrasonic transducer module of the embodiment of the disclosure has the advantages of convenient use and reduction in equipment quantities and cost.

What is claimed is:

1. An ultrasonic transducer module, comprising:

a first electrode layer;

a second electrode layer;

a first piezoelectric material layer, disposed between the first electrode layer and the second electrode layer;

a third electrode layer, wherein the second electrode layer is disposed between the first piezoelectric material layer and the third electrode layer;

a fourth electrode layer;

a second piezoelectric material layer, disposed between the third electrode layer and the fourth electrode layer; and an insulation layer, disposed between the second electrode layer and the third electrode layer, wherein, a wavelength of a sound wave corresponding to frequency corresponding to a thickness of the first piezoelectric material layer in the second piezoelectric material layer is 21, a thickness of the second piezoelectric material layer is T1, and $((2N-1)/4-1/8)\times\lambda1<T1<((2N-1)/4+1/8)\times\lambda1$, where N is a positive integer, wherein a wavelength of a sound wave corresponding to the frequency corresponding to the thickness of the first piezoelectric material layer in the insulation layer is λ4, and a thickness of the insulation layer is less than one tenth of λ4.

2. The ultrasonic transducer module according to claim 1, further comprising a first matching layer, wherein the fourth electrode layer is disposed between the second piezoelectric material layer and the first matching layer, an average value of the frequency corresponding to the thickness of the first piezoelectric material layer and frequency corresponding to the thickness of the second piezoelectric material layer is f, a wavelength of a sound wave corresponding to f in the first matching layer is λ2, a thickness of the first matching layer is T2, and $((2K-1)/4-1/8)\times\lambda2<T2<((2K-1)/4+1/8)\times\lambda2$, where K is a positive integer.

3. The ultrasonic transducer module according to claim 2, further comprising a second matching layer, wherein the first matching layer is disposed between the fourth electrode layer and the second matching layer, a wavelength of a sound wave corresponding to f in the second matching layer is λ3, a thickness of the second matching layer is T3, and $((2M-1)/4-1/8)\times\lambda3<T3<((2M-1)/4+1/8)\times\lambda3$, where M is a positive integer.

4. The ultrasonic transducer module according to claim 1, wherein the first piezoelectric material layer is divided into a plurality of segments in an extending direction, the first electrode layer is divided into a plurality of segments in the extending direction, the second piezoelectric material layer is divided into a plurality of segments in the extending direction, and the third electrode layer is divided into a plurality of segments in the extending direction.

5. The ultrasonic transducer module according to claim 4, wherein the first electrode layer, the first piezoelectric material layer, and the second electrode layer form a linear array ultrasonic transducer, and the third electrode layer, the second piezoelectric material layer, and the fourth electrode layer form another linear array ultrasonic transducer.

6. The ultrasonic transducer module according to claim 4, wherein the first electrode layer, the first piezoelectric material layer, and the second electrode layer form a linear array ultrasonic transducer, and the third electrode layer, the second piezoelectric material layer, and the fourth electrode layer form a phase array ultrasonic transducer.

7. The ultrasonic transducer module according to claim 4, wherein the first electrode layer, the first piezoelectric material layer, and the second electrode layer form an arc-shaped ultrasonic transducer, and the third electrode layer, the second piezoelectric material layer, and the fourth electrode layer form an arc-shaped ultrasonic transducer.

8. The ultrasonic transducer module according to claim 1, wherein the first electrode layer, the first piezoelectric material layer, and the second electrode layer form a single array element circular ultrasonic transducer, and the third electrode layer, the second piezoelectric material layer, and the fourth electrode layer form a single array element circular ultrasonic transducer.

9. The ultrasonic transducer module according to claim 1, wherein a width of the first piezoelectric material layer is smaller than or equal to a width of the second piezoelectric material layer.

10. The ultrasonic transducer module according to claim 1, wherein a width of the first piezoelectric material layer is greater than a width of the second piezoelectric material layer.

11. The ultrasonic transducer module according to claim 1, wherein a central axis of the first piezoelectric material layer and a central axis of the second piezoelectric material layer are aligned with each other.

12. The ultrasonic transducer module according to claim 1, wherein a central axis of the first piezoelectric material layer is offset from a central axis of the second piezoelectric material layer.

13. An ultrasonic transducer module, comprising:

a first electrode layer;

a second electrode layer;

a first piezoelectric material layer, disposed between the first electrode layer and the second electrode layer;

a third electrode layer, wherein the second electrode layer is disposed between the first piezoelectric material layer and the third electrode layer;

a fourth electrode layer;

a second piezoelectric material layer, disposed between the third electrode layer and the fourth electrode layer; and an insulation layer, disposed between the second electrode layer and the third electrode layer, wherein an absolute value of a difference between a thickness of the first piezoelectric material layer and a thickness of the second piezoelectric material layer is less than 10% of the thickness of the first piezoelectric material layer, a width of the first piezoelectric material layer is d, a width of the second piezoelectric material layer is D, and $d<4D/5$, wherein a wavelength of a sound wave in the insulation layer corresponding to frequency corresponding to the thickness of the first piezoelectric material layer is λ4, and a thickness of the insulation layer is less than one tenth of λ4.

14. The ultrasonic transducer module according to claim 13, further comprising a driver, electrically connected to the first electrode layer, the second electrode layer, the third electrode layer, and the fourth electrode layer, and configured to simultaneously drive the first piezoelectric material layer and the second piezoelectric material layer.

15. The ultrasonic transducer module according to claim 13, further comprising a first matching layer, wherein the fourth electrode layer is disposed between the second piezoelectric material layer and the first matching layer, an average value of the frequency corresponding to the thickness of the first piezoelectric material layer and frequency corresponding to the thickness of the second piezoelectric material layer is f, a wavelength of the a sound wave corresponding to f in the first matching layer is λ2, a thickness of the first matching layer is T2, and $((2K-1)/4-\frac{1}{8})\times\lambda 2<T2<((2K-1)/4+\frac{1}{8})\times\lambda 2$, where K is a positive integer.

16. The ultrasonic transducer module according to claim 15, further comprising a second matching layer, wherein the first matching layer is disposed between the fourth electrode layer and the second matching layer, a wavelength of a sound wave corresponding to f in the second matching layer is λ3, a thickness of the second matching layer is T3, and $((2M-1)/4-\frac{1}{8})\times\lambda 3<T3<((2M-1)/4+\frac{1}{8})\times\lambda 3$, where M is a positive integer.

17. The ultrasonic transducer module according to claim 13, wherein the first piezoelectric material layer is divided into a plurality of segments in an extending direction, the first electrode layer is divided into a plurality of segments in the extending direction, the second piezoelectric material layer is divided into a plurality of segments in the extending direction, and the third electrode layer is divided into a plurality of segments in the extending direction.

18. An ultrasonic transducer module, comprising:

a first electrode layer;

a second electrode layer;

a first piezoelectric material layer, disposed between the first electrode layer and the second electrode layer;

a third electrode layer, wherein the second electrode layer is disposed between the first piezoelectric material layer and the third electrode layer;

a fourth electrode layer;

a second piezoelectric material layer, disposed between the third electrode layer and the fourth electrode layer; and an insulation layer, disposed between the second electrode layer and the third electrode layer, wherein, an absolute value of a difference between a thickness of the first piezoelectric material layer and a thickness of the second piezoelectric material layer is less than 10% of the thickness of the first piezoelectric material layer, and a width of the first piezoelectric material layer is different from a width of the second piezoelectric material layer, wherein a wavelength of a sound wave corresponding to frequency corresponding to the thickness of the first piezoelectric material layer in the insulation layer is λ4, and a thickness of the insulation layer is less than one tenth of λ4.

* * * * *